United States Patent [19]

Alter et al.

[11] 4,347,926
[45] Sep. 7, 1982

[54] SCREW ORIENTER

[75] Inventors: William F. Alter, Lexington; Jonathan J. DeBoer, Nicholasville; Charles R. Shellenberger, Lexington, all of Ky.

[73] Assignee: Square D Company, Palatine, Ill.

[21] Appl. No.: 189,255

[22] Filed: Sep. 22, 1980

[51] Int. Cl.$^3$ ............................................. B65G 47/24
[52] U.S. Cl. .................................. 198/388; 198/398; 221/160
[58] Field of Search ............. 198/388, 390, 394, 398, 198/411; 221/159, 160, 173

[56] References Cited

U.S. PATENT DOCUMENTS 3,169,629  2/1965  Randrup ............................ 198/388
3,258,106  6/1966  Booth ............................ 198/394 X

FOREIGN PATENT DOCUMENTS 52-75764  6/1977  Japan .................................. 198/388

Primary Examiner—Robert B. Reeves
Assistant Examiner—Douglas D. Watts
Attorney, Agent, or Firm—Larry I. Golden; Norton Lesser; Richard T. Guttman

[57] ABSTRACT

A screw orienting assembly in which slotted headless screws are sequentially fed with their elongate axis perpendicular to and in the same plane as a guide rail having a width less than the width of the screw slots. The screws are rotated about their elongate axis and advanced along the rail. The slots of those screws having their slotted end engaged with the rail become engaged with the rail in response to the rotation of those screws such that the slot is in alignment with the rail. The slot-engaged or "seated" screws are advanced along the rail to a predetermined point and discharged therefrom in like orientation with respect to their slotted ends for further processing. Those screws not seated on the rail are discharged from the rail before reaching the predetermined point.

10 Claims, 6 Drawing Figures

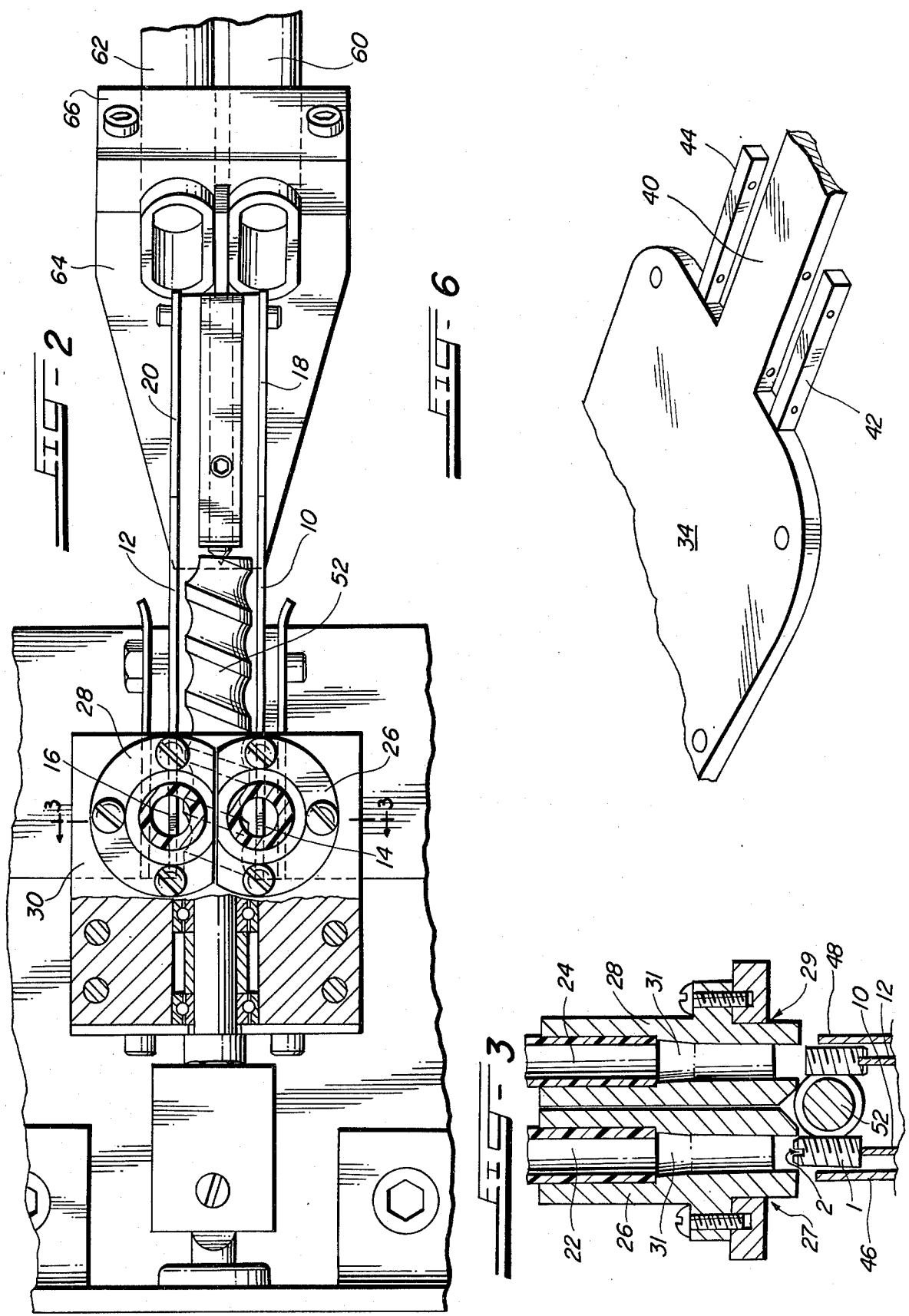

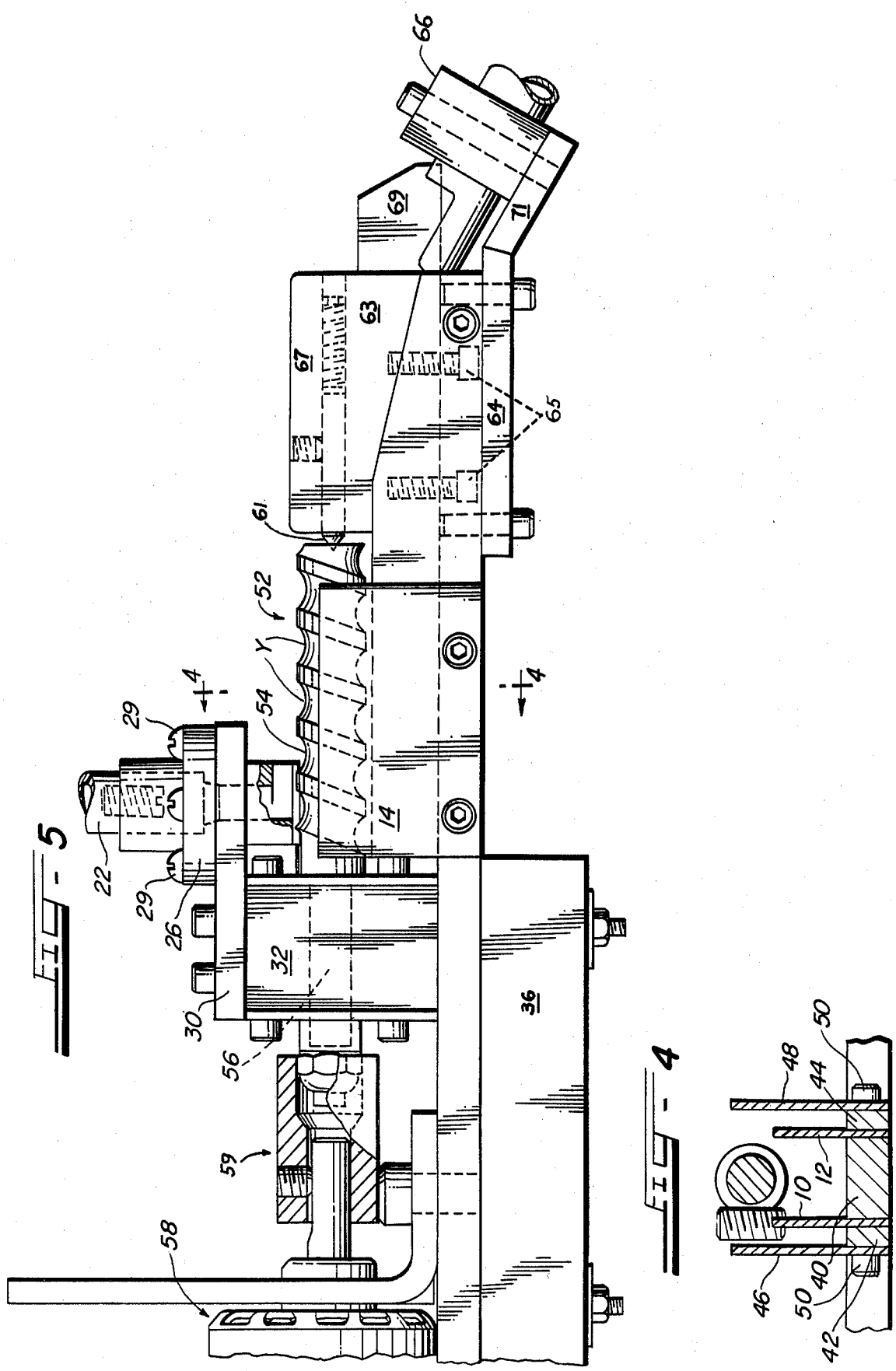

SCREW ORIENTER

FIELD OF THE INVENTION

This invention relates to apparatus for orienting slotted end screws and more particularly to improved and/or more economical apparatus for uniformly orienting slotted headless screws.

DESCRIPTION OF PRIOR ART

Slotted headless screw orienters are available for uniformly orienting headless screws with respect to their slotted end. Presently available devices which orient slotted headless screws include types which operate by dropping the screws onto a minuscule air-jet at the base of a cavity in a shuttle block. The back pressure build-up varies depending upon which end of the screw is against the air-jet. Because the slotted end offers less resistance to airflow than the solid end, a differentiated signal results from the back pressure and causes the shuttle in the block to selectively move in order to orient each screw with respect to slot-up or slot-down position. This system is relatively expensive and requires the regular removal of dust and other attendant impurities which may interfere with the pressure sensing device or shuttle.

A second type of device differentiates between slot-up or slot-down positions on the basis of a tapering of the screw shaft or some other distinct physical characteristic of the screws. While this type of device can often be used, there are many instances requiring the cross-sectional area of the screw to be constant throughout the length of the screw rendering this second type of device ineffective. There is a need for a simple, effective, economic screw orienting assembly capable of dependably orienting uniform cross-sectional area slotted headless screws.

SUMMARY OF THE INVENTION

It is an object of this invention to provide a slotted headless screw orienter which will dependably and uniformly orient slotted headless screws without requiring a tapering of the screw shaft.

It is a further object of this invention to provide a screw orienter having only one main moving part, thereby reducing the possibility of error or malfunction and reducing the need for supervision.

It is a further object of this invention to provide an improved screw orienter which may concurrently accommodate screws having two different diameters.

These objects are achieved by the screw orienter apparatus of the present invention which preferably has two inlet tubes, each tube sequentially feeding slotted headless screws for the engagement of either end of each screw with an edge of a respective horizontal guide rail. The rails are positioned parallel to each other and the screws are fed in the same plane as the rail and perpendicular to the engaging portion of the rail. Each screw is also engaged intermediate its ends on a first surface portion by a worm gear running parallel to and between the guide rails and engaged on an opposite surface portion by a respective side shield similarly arranged parallel to the guide rails.

The groove of the worm gear coupled with the respective side shields form a plurality of adjacent compartments in registration with the respective rails, which, because of the spiraling groove of the worm gear, are advanced in a direction along the rail upon rotation of the gear. The worm gear coupled with the side shield aid in maintaining the vertical position of the screws and provide lineal and rotational forces to the screws. Each screw is thereby supported, rotated about its elongate axis and propelled along the rail, while maintaining the elongate axis of the screw perpendicular to the guide rail and in the same plane as the rail, thereby causing slot down screws to seat upon the rail upon alignment of the slot with the rail. The guide rails extend substantially past the end of the worm gear and side shields, and may be, from a point at the end of the worm gear, inclined slightly downward to assist in the movement of the seated screws along this portion of the rail. Upon reaching the end of the worm gear and side shields, the unseated screws, not being retained by seating on the rails, are discharged from the guide rails by the force of gravity. Upon reaching the end of the worm gear, the seated screws are moved along the rails by the force of sequentially later fed screws. Vibration may also be used to facilitate better movement along the rails.

Each seated screw continues along a respective rail until coming to the end of the rail where the screw is discharged in an end over end fashion, in like orientation with respect to their slotted ends, into exit tubes which transport the oriented screws for further processing.

The foregoing and other objects, features and advantages of this invention will be apparent from the following more particular description of a preferred embodiment thereof, as illustrated in the accompanying drawings and the claims.

BRIEF DESCRIPTION OF THE DRAWINGS

FIG. 2 is a top view of the screw orienter shown in FIG. 1.

FIG. 3 is a sectional view taken along lines 3—3 in FIG. 2.

FIG. 4 is a sectional view taken along lines 4—4 in FIG. 5.

FIG. 5 is a side view of the screw orienter shown in FIG. 1.

FIG. 6 is a partial perspective view showing the mounting pan and spacer bars of the present invention.

DESCRIPTION OF THE PREFERRED EMBODIMENT

Figure 1:
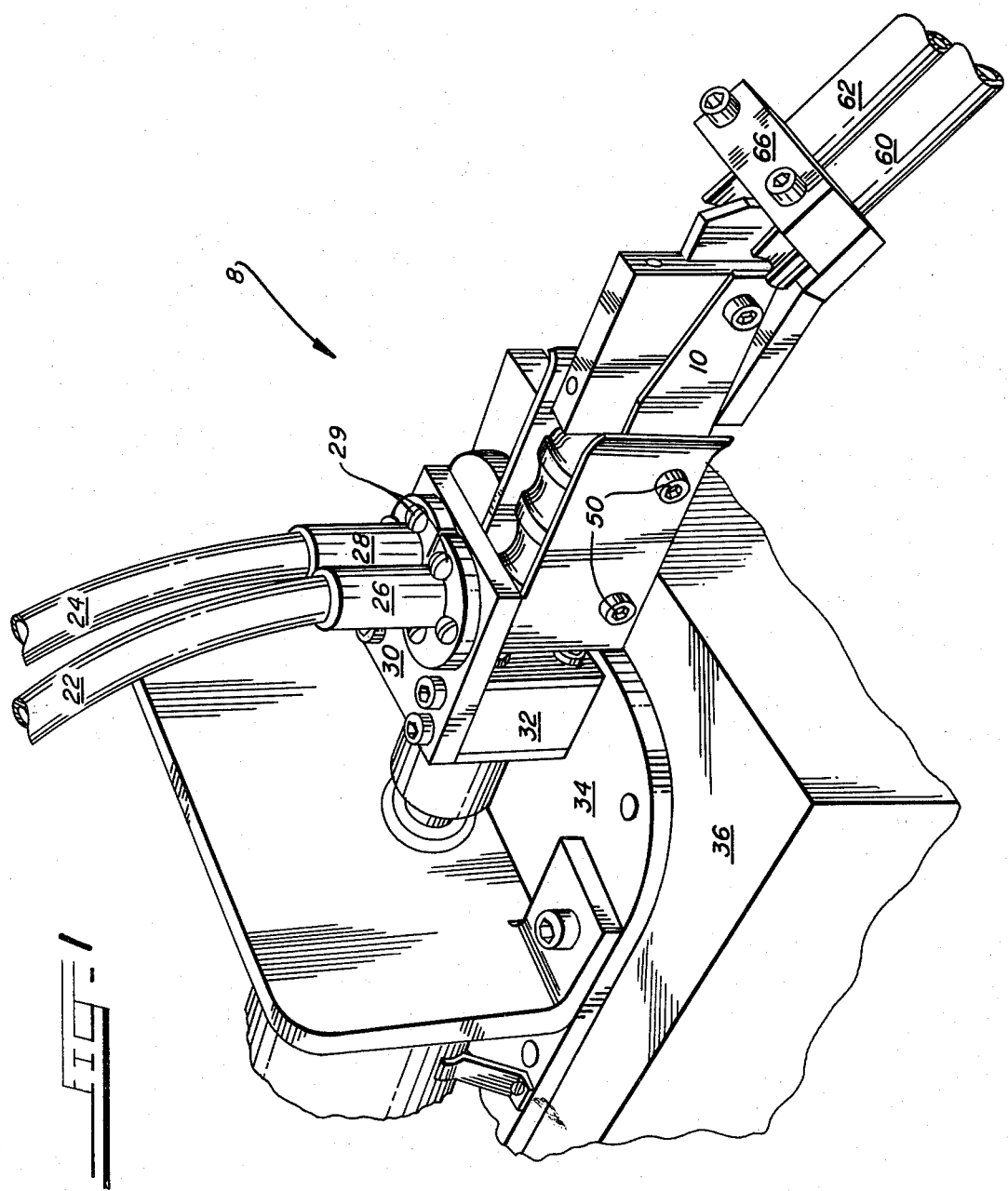
FIG. 1 is a perspective view of a screw orienter in accordance with the present invention.

Referring now to the Drawings, and particularly to FIGS. 1, 2 and 3 thereof, the entire screw orienting assembly is indicated generally by the reference character 8. The preferred embodiment includes two guide rails 10 and 12, as best shown in FIG. 2, onto which screws 1 having a slot 2 in one end are fed. The rails 10 and 12, each having a top portion having a width slightly less than the width of the slot 2 in each of the screws to be oriented thereon, extend horizontally from first ends 14 and 16 respectively to second ends 18 and 20 respectively, with the second ends having slightly downward inclines.

This particular embodiment is adapted to orient ¼-28×½ screws along the first rail 10 and #12-28-½ screws along the second rail 12. Rail 10 has a width of approximately 0.107 cm. while the width of rail 12 measures approximately 0.094 cm. to accommodate the slots of the respective screws. Each rail has a total length of substantially 9.15 cm. with the downwardly inclined portion measuring about 3.175 L cm. in length and inclined approximately 12.6 degrees from the horizontal.

As shown in FIG. 1, two inlet tubes 22 and 24 direct the screws to rails 10 and 12 respectively, channelling each screw with its elongate axis perpendicular to and in the same plane as the rail toward which the screw is directed for depositing each screw in a vertical position on a respective rail.

The screws are sequentially fed into the tubes by a conventional sorting or vibratory hopper bowl (not shown) which takes a batch of screws, including screws of the two earlier mentioned sizes, separates them and feeds the screws of one size into inlet tube 22 and the screws of the other size into inlet tube 24. The sorting bowl is of the commercially available type and may be obtained, for example, from Moore Feed Corporation in Indianapolis, Indiana, Parts Feeders Incorporated in Hartford, Connecticut or Peeco Division Automation Devices Inc. in Fairview, Pennsylvania.

Inlet tubes 22 and 24 are connected respectively to ferrules 26 and 28. The ferrules are fastened, side by side, by fasteners 29 at the forward end portion of a generally square shaped entrance plate 30.

Referring to FIG. 3, the bottom portion of ferrules 26 and 28 extend respectively through holes 27 and 29 having diameters of approximately 1.27 cm. in the entrance plate. The ferrules 26 and 28 thereby provide passageways 31 for the screws 1 from the ends of the inlet tubes toward the guide rails and direct the end surface of each screw into engagement with a respective rail 10 or 12 with the elongate axis of the screw perpendicular to and in the same plane as the engaged rail. The portions of the ferrules 26 and 28 which engage inlet tubes 22 and 24 respectively have inner diameters of approximately 0.965 cm. The opposite end openings of ferrules 26 and 28 are approximately 0.831 cm. in diameter and 0.721 cm. in diameter respectively to provide a passage for the screw corresponding to the respective screw diameters.

Upon passage of a screw 1 through a ferrule, either the slotted end or the opposite end forms a leading end of the screw which will engage the rail. Upon initial engagement of the rail by each screw, the portion defining the slot in a screw having its slotted end engaged with the rail in all probability will not be engaged with the rail, i.e., the slot will likely have a different angular orientation than the orientation of the rail. As later discussed, a rotational force is imparted to each screw in order to align the slots of slot-down screws with the engaged rail thereby causing the slot portion to engage the rail.

Referring to FIG. 1, the rearward portion of the entrance plate 30 is mounted on a bearing block 32, with the forward portion extending over the first ends of the guide rails 14 and 16 such that the holes 27 and 29 in the entrance plate 30 are in registration with guide rails 10 and 12 respectively.

The bearing block 32 is mounted to an orienter base 34 which is in turn mounted on a vibrating unit 36 which vibrates the assembly and thereby aids in the advancement of the screws along the respective rails. In this particular embodiment, an In-line vibrator is used which is commercially available from Feeder Corporation of America located in Melrose Park, Illinois. The base 34 includes a large rectangular shaped portion 38 with rounded corners and a relatively narrow rectangular portion 40 extending from the center of one of the sides of the larger portion 38 in a panhandle fashion. The narrow portion 40 has a width of approximately 1.245 cm. The bearing block 32 is mounted on the large rectangular portion 38 of the orienter base 34 adjacent the point from which the narrow portion 40 extends.

The guide rails 10 and 12 are fastened to opposite sides of the narrow rectangular portion 40 of the orienter base 34 forming 90° angles therewith. Two spacer bars 42 and 44 are respectively fastened to the outside of the guide rails 10 and 12, and side shields 46 and 40 are respectively fastened to the outside of the spacer bars 42 and 44. The width of spacer bar 42 is approximately 0.264 cm. while the width of spacer bar 44 is approximately 0.231 cm. The spacer bars 38 and 40 space the respective side shields 46 and 48 a distance slightly greater than one screw radius from the center of the respective guide rails 10 and 12.

The side shields 46 and 48 are vertically positioned rectangular plates running parallel to guide rails 10 and 12 and extending vertically above the guide rails a distance of approximately 1.02 cm.

The side shields 46 and 48 form a barrier along which the screws are advanced and extend forward to the points approximately adjacent the points at which the guide rails 10 and 12 incline downward. The forward edge of each shield 46 and 48 is curved slightly outward and away from its associated guide rail. As later described, the outward curve facilitates ready disengagement from the rails of those screws not having their slots engaged with the rail.

As can be seen in FIG. 1, holding bolts 50, or some other similar securing device, fasten the side shield 46, the spacer bar 42 and the guide rail 10 to the narrow rectangular portion 40 of the orienter base 34. Similarly, the second side shield 48, the second spacer bar 44 and the second guide rail 12 are fastened to the opposite side of the narrow rectangular portion 40 of the orienter base 34.

A worm gear 52 having concave portions Y defining a spiral groove 54, is positioned parallel, between, and with its elongate axis above the upper edge of guide rails 10 and 12. The worm gear extends parallel to and on a first side of each guide rail while the side shields extend parallel to and on an opposite side of each guide rail. The worm gear is approximately 8.76 cm. in length with the actual worm portion 54 extending linearly approximately 5.33 cm. The worm gear 52 passes through a clearance hole 56 in the bearing block 32 and is driven at a first end by a motor, generally indicated at 58 through standard coupling means generally shown at 59. The opposite end of the worm gear is supported by a set screw 61 which protrudes outward from a center separater 63 which is mounted by fasteners 65 on the top side of narrow rectangular portion 40 of orienter base 34. The center separater 63 includes a main portion 67 and a smaller portion 69. Main separater portion 67 has a height of approximately 2.22 cm. The hole for set screw 61 is located approximately 0.635 cm. from the top of this portion of the separater. The smaller portion 69 separates two exit tubes 60 and 62 which are respectively positioned adjacent the end of rails 10 and 12 as seen in FIGS. 1, 2 and 5. The tubes 60 and 62 are held by tube clamp 66 which is fastened to tube support 64 which in turn is fastened to the underside of rectangular portion 40. The total length of the separater 63 is about 5.59 cm. with the smaller portion 69 extending approximately 1.68 cm. in length. The top of the smaller portion has a height of about 1.27 cm., with the furthermost 0.622 cm. from the worm gear being inclined at an angle of approximately 60° downward.

Tube support 64 is approximately 6.53 cm. in length and has a portion 71 also inclined 60° downward for a distance of approximately 1.98 cm.

As can readily be seen from FIGS. 2 and 5, top portions of exit tubes 60 and 62 have been removed, providing an open top portion, in order that the tubes may receive screws discharging in end over end fashion from rails 10 and 12.

The worm gear is driven at a constant 130 rpm. The gear 52 has a pitch of 0.846 cm. and has an outer tooth diameter of 1.02 cm. Surface Y is formed on a radius of substantially 0.356 cm. from a center of rotation located substantially 0.686 cm. from the axis of rotation of worm gear 52. The groove 54 of worm gear 52, the respective side shields 42 and 44, and the respective guide rails 10 and 12 form a plurality of compartments for advancing the screws from first ends 14 and 16 respectively toward second ends 18 and 20 of the respective guide rails upon the rotation of the worm gear 48 in the appropriate direction.

The screws are each fed such that a leading end of each screw is engaged with a respective rail. Those screws having a slotted leading end will become "seated" on the rail, i.e., those screws will have the slot portion engaged with the rail in response to rotation of the screw such that the slot is aligned with the rail. The rotational force is imparted by the rotating worm gear on one side of the screw and the stationary side shield on the other side of the screw.

The seated screws are sufficiently supported by the rail alone. They do not require the side shield or worm gear to remain supported on the rail. Accordingly, upon reaching the end of the side shield, the seated screws remain seated on the rail and continue to move along the rail as they are pushed by later fed screws and aided by vibration and a downwardly inclined rail.

The unseated screws on the other hand require the side shield for support and are therefore discharged from the rail at the point where the side shield ends. The outward curve of the side shield facilitates smooth removal of the screws from the rail at that point.

The seated screws continue to the end of the guide rail where they are uniformily discharged in end over end fashion into an exit tube which carries the similarly oriented screws for further processing.

While the invention has particularly been shown and described with reference to a preferred embodiment it will be understood by those skilled in the art that variations in form, construction and arrangements may be made therein without departing from the spirit and scope of the invention. All such variations are intended to be covered in the appended claims.

We claim:

1. Apparatus for orienting slotted headless screws fed by a feeder bowl, said apparatus comprising;
   a guide rail onto which the screws are fed, said rail having a top portion with a width measuring slightly less than the width of the slots in said screws;
   means for sequentially moving each screw from said bowl along a predetermined path, with either one end or the other end of each screw forming a leading end in response to the movement, and depositing said screws in a vertical position with said leading end of each screw engaged with said top portion of said rail;
   means for supporting, rotating and advancing said screws along said rail towards a second end of said rail to align said slot of each screw having the slot in said leading end with said top portion for enabling said rail to seat in said slot and to advance said screws along said rail in their substantially vertical position,
   said means for supporting, rotating and advancing said screws comprises a worm gear extending parallel to and on a first side of said guide rail; and a side shield extending parallel to and on an opposite side of said guide rail;
   first discharge means for discharging each screw having a slot engaged by the rail from said rail at a selected position with each leading end having a predetermined orientation; and
   second discharge means for discharging each screw having said slot in said other end at another position.

2. Apparatus for orienting slotted headless screws as claimed in claim 1 wherein said first discharge means comprises an exit tube positioned adjacent said second end of said guide rail and having an open top portion to facilitate receipt of said screws which reach the end of said guide rail.

3. Apparatus for orienting slotted headless screws as claimed in claim 2 wherein said second discharge means comprises said guide rail extending past the point to which the worm gear and side shield extend.

4. Apparatus for orienting slotted headless screws as claimed in claim 1 including a vibrator associated with said guide rail and causing vibration thereof facilitating advancement of said screws along said rail.

5. Apparatus for orienting slotted headless screws as claimed in claim 1 or 4 wherein said guide rail has a downwardly inclined second end.

6. Apparatus for orienting slotted headless screws as claimed in claim 5 wherein said side shield has a forward edge curved outward from said guide rail.

7. Apparatus for orienting slotted headless screws as claimed in claim 1 including a second guide rail symetrically positioned on the opposite side of said worm gear from said guide rail; and a second side shield symetrically positioned on the opposite side of said worm gear from said side shield.

8. Slotted headless screw orienting apparatus comprising:
   a guide rail having a first end and a second end, said rail including a top portion having a width slightly less than the width of the slots in the screws to be oriented;
   an inlet tube for channelling said screws toward said first end of said rail; said tube positioned such that said screws will be channelled through said tube and deposited in a vertical position on the top portion of said rail;
   a worm gear on a first side of said guide rail extending parallel thereto;
   a side shield on an opposite side of said guide rail extending parallel thereto;
   said worm gear and said side shield positioned with respect to said rail to form a plurality of compartments for advancing said screws from said first end to said second end of said rail upon rotation of said worm gear;
   said second end of said guide rail extending substantially past said worm gear and said side shield, an exit tube positioned adjacent said second end of said guide rail and having a top portion removed to facilitate receipt of said screws which are discharged from said second end of said rail.

9. Slotted headless screw orienting apparatus as claimed in claim 8 wherein said guide rail has a downwardly inclined second end.

10. Slotted headless screw orienting apparatus as claimed in claim 9 including a vibrator associated with said guide rail and causing vibration thereof facilitating advancement of said screws along said rail.

* * * * *